(12) United States Patent
Higgins et al.

(10) Patent No.: US 11,837,047 B2
(45) Date of Patent: Dec. 5, 2023

(54) GAMING SYSTEM, DEVICE, AND METHOD TO TRACK ELECTRONIC TICKETS AND VALUES THEREOF

(71) Applicant: IGT, Las Vegas, NV (US)

(72) Inventors: Kevin Higgins, Reno, NV (US); Jeffery Shepherd, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/998,192

(22) Filed: Aug. 20, 2020

(65) Prior Publication Data

US 2021/0035409 A1 Feb. 4, 2021

Related U.S. Application Data

(63) Continuation of application No. 16/170,252, filed on Oct. 25, 2018, now abandoned.

(51) Int. Cl.
*G07F 17/32* (2006.01)
*G07F 17/42* (2006.01)

(52) U.S. Cl.
CPC ...... *G07F 17/3244* (2013.01); *G07F 17/3225* (2013.01); *G07F 17/42* (2013.01); *G07F 17/3239* (2013.01); *G07F 17/3288* (2013.01)

(58) Field of Classification Search
None
See application file for complete search history.

(56) References Cited

U.S. PATENT DOCUMENTS

| 2003/0078094 | A1* | 4/2003 | Gatto | G07F 19/211 |
| | | | | 463/25 |
| 2005/0227760 | A1* | 10/2005 | Vlazny | G07F 17/3223 |
| | | | | 463/28 |
| 2006/0258439 | A1 | 11/2006 | White | |
| 2013/0065667 | A1 | 3/2013 | Nelson et al. | |
| 2015/0105142 | A1* | 4/2015 | Amaitis | G07F 17/3244 |
| | | | | 463/25 |
| 2017/0092062 | A1 | 3/2017 | Tsutsui | |
| 2017/0092076 | A1 | 3/2017 | Anderson et al. | |
| 2018/0165916 | A1* | 6/2018 | Marantelli | G07F 17/323 |
| 2020/0134973 | A1 | 4/2020 | Higgins et al. | |

OTHER PUBLICATIONS

Official Action for U.S. Appl. No. 16/170,252, dated Dec. 13, 2019 13 pages.
Official Action for U.S. Appl. No. 16/170,252, dated May 21, 2020 14 pages.

* cited by examiner

*Primary Examiner* — Damon J Pierce
(74) *Attorney, Agent, or Firm* — SHERIDAN ROSS P.C.

(57) ABSTRACT

A system can be capable of receiving electronic ticket issuance information from a first gaming device, where the electronic ticket issuance information includes an identifier of the first gaming device that issued an electronic ticket, a time that the electronic ticket was issued, and an electronic ticket value associated with an issued state of the electronic ticket. The system may further be capable of tracking a status of the electronic ticket to determine that the electronic ticket has transitioned from the issued state to a redeemable state, determining that the electronic ticket has been presented for redemption and, in response thereto, causing the electronic ticket value to change to a second electronic ticket value associated with a redeemed state of the electronic ticket.

20 Claims, 7 Drawing Sheets

GAMING SYSTEM, DEVICE, AND METHOD TO TRACK ELECTRONIC TICKETS AND VALUES THEREOF

CROSS REFERENCE TO RELATED APPLICATION

The present application is a continuation of and claims priority to U.S. patent application Ser. No. 16/170,252, filed Oct. 25, 2018, the entire disclosure of which is hereby incorporated herein by reference, in its entirety, for all it teaches and for all purposes.

BACKGROUND

The present disclosure is generally directed toward gaming devices and system and, more specifically, directed toward tracking electronic tickets and values thereof within a gaming device or system.

It is becoming increasingly desirable for casinos to support sports book betting via gaming machines and electronic table games on a casino floor. One challenge associated with supporting sports betting from gaming machines is how to fund a wager and how to optionally pay a player for a winning wager. Another challenge is to give the player something which they can later use to claim their winnings for their wager, if there were any. In some sports books, players who are not using wagering accounts to conduct sports betting are required to be given a sports wagering ticket that acts as a claim to their prize.

BRIEF SUMMARY

In certain embodiments, the present disclosure relates to a gaming system, device, and method used to track electronic tickets and values thereof. In some embodiments, a method of managing award distribution in a gaming system is provided that includes: receiving, at a gaming server, an input that indicates a player's desire to have a ticket issued by a first gaming device; generating, at the gaming server, an electronic record representing an electronic ticket to be issued or having already been issued by the first gaming device; causing the first gaming device to update a first credit meter as part of issuing the electronic ticket to the player, wherein the electronic ticket is issued with a first electronic ticket value associated with an issued state of the electronic ticket; updating, at the gaming server, the electronic record to include the first electronic ticket value; determining, at the gaming server, that the electronic ticket is being redeemed or has been redeemed; and updating, at the gaming server, the electronic record to indicate that the electronic ticket has transitioned from the issued state, then to a redeemable state, and then to a redeemed state, wherein the electronic record is also updated to indicate that the electronic ticket, in the redeemed state, comprises a second electronic ticket value that is configurable to be different than the first electronic ticket value.

In some embodiments, a gaming device is provided that includes: a communication interface that facilitates machine-to-machine communications; a processor coupled with the communication interface; and a computer-readable storage medium coupled with the processor and including instructions that are executable by the processor, where the instructions include: a credit meter that stores monetary values available to a player to place a wager in connection with a game of chance; and a set of instructions that issue electronic tickets, where a first electronic ticket issued for the player at a first time is issued with a first electronic ticket value associated with an issued state of the first electronic ticket, where the first electronic ticket is issued with an ability to transition to a redeemable state and a redeemed state, and where the first electronic ticket is capable of having a second electronic ticket value associated therewith in the redeemed state that is different from the first electronic ticket value.

In some embodiments, a gaming system is provided that includes: a communication interface that facilitates communications with gaming devices; a processor coupled with the communication interface; and a computer-readable storage medium coupled with the processor, the computer-readable storage medium including processor-executable instructions that, when executed by the processor, cause the processor to: receive electronic ticket issuance information from a first gaming device, where the electronic ticket issuance information includes an identifier of the first gaming device that issued an electronic ticket, a time that the electronic ticket was issued, and an electronic ticket value associated with an issued state of the electronic ticket; track a status of the electronic ticket to determine that the electronic ticket has transitioned from the issued state to a redeemable state; and determine that the electronic ticket has been presented for redemption and, in response thereto, cause the electronic ticket value to change to a second electronic ticket value associated with a redeemed state of the electronic ticket Additional features and advantages are described herein and will be apparent from the following Description and the figures.

DETAILED DESCRIPTION

Figure 1:
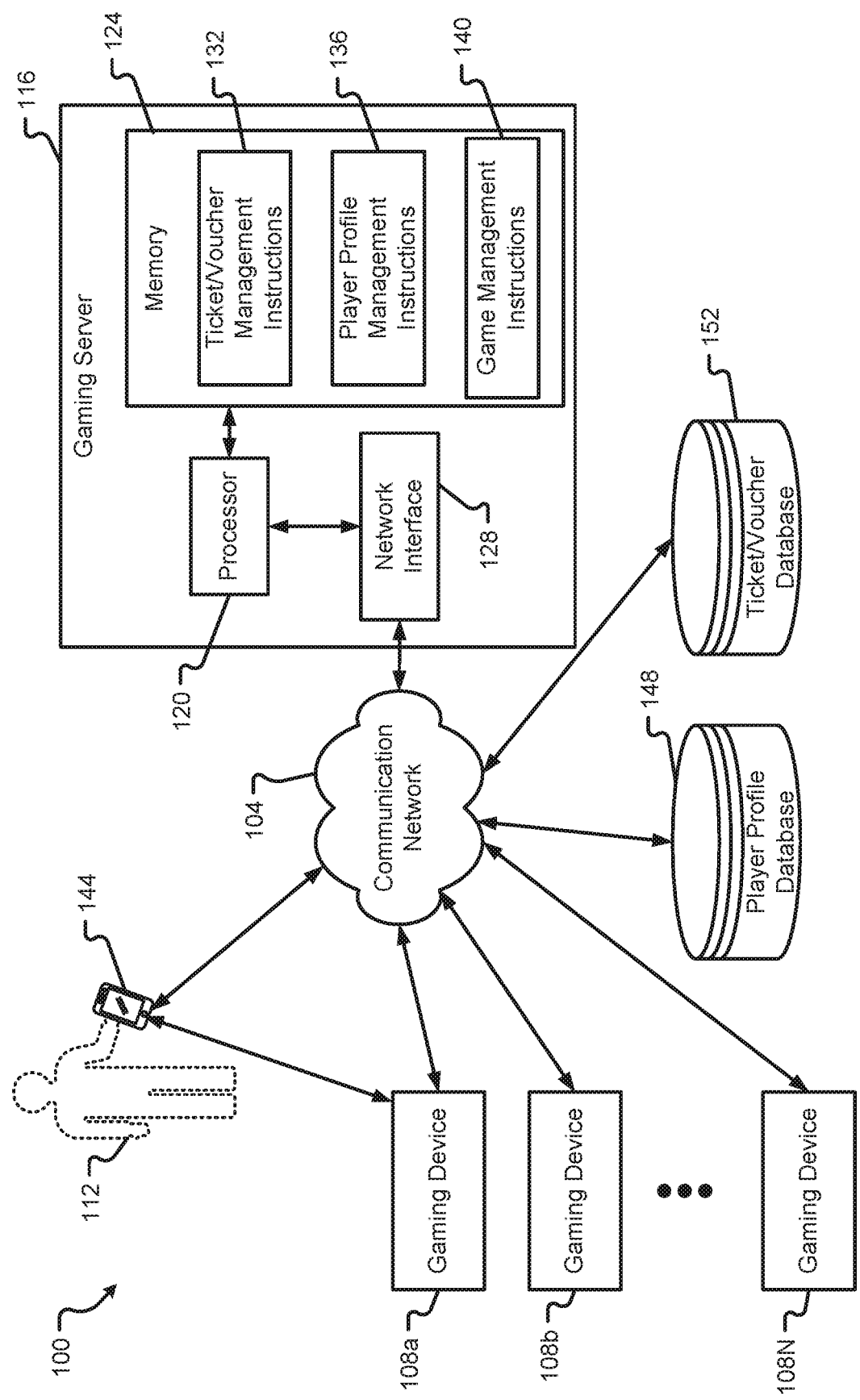
FIG. 1 is a block diagram of a gaming system accordance with embodiments of the present disclosure.

Embodiments of the present disclosure will be described in connection with a gaming system having one or multiple user devices that enable gaming activity. While certain embodiments of the present disclosure will reference the use of an Electronic Gaming Machine (EGM) as a device that enables players to participate in gaming activity, it should be appreciated that embodiments of the present disclosure are not so limited. For instance, any computing device, personal gaming device, or collection of computing devices may be used to facilitate player engagement with a gaming system.

Embodiments of the present disclosure provide an enhancement to electronic ticketing or voucher systems to solve the problems discussed above where a player is provided with a traditional electronic ticket or voucher (e.g., a Ticket-In-Ticket-Out (TITO) voucher) in response to the player winning some wager or game of chance. Embodiments of the present disclosure enable the player to use the electronic ticket or voucher as a claim for a winning bet. Embodiments of the present disclosure also leverage a funds transfer capability provided by electronic ticket or voucher systems to move a particular wager, such as a sports wager, off an EGM's credit meter and to pay the player, by moving funds back to a gaming device's credit meter, or to pay them at a cashier station, or kiosk, for their winning wager.

A traditional electronic ticket, physical ticket, or voucher usually only has one value associated with it: the amount the ticket or voucher cost. This is not valuable for issuing the player a ticket for a sports wager because the sporting contest that the wager is placed on has not yet occurred when the wager is placed. In other words, the value that a ticket was issued for when a wager is placed is determinable, but the redemption value of the ticket or voucher is not yet determinable. To solve this challenge of delayed redemption value, embodiments of the present disclosure provide a new electronic ticket, physical ticket, or voucher type that supports two associated monetary values: an issued amount and a redeemed amount. Embodiments of the present disclosure may allow for an electronic ticket, physical ticket, or voucher to be issued with a first amount. In the sports book case discussed above, the first amount would be the amount of a sports wager, but this is not what the ticket/voucher is finally worth because the sporting contest has not concluded when the wager was originally placed. Once the sporting contest has concluded, and the winning amount is determined, the winning amount would become the second amount associated with the ticket/voucher (e.g., a redeemable amount) and the ticket/voucher would then become payable.

Today a ticket/voucher, in the parlance of the Gaming Standards Association, represents an amount of money that is cashed out from a machine. At the time of cash out, the amount of money on a gaming machine's credit meter is zeroed out and a voucher is issued or printed from the machine representing the amount of money that was on the credit meter at the time of zeroing. Printed on the ticket/voucher is a barcode and often other information such as the date, the amount of money represented by the ticket/voucher, and information identifying the property and the gaming machine where it was printed. A back-end system is used to facilitate ticket/voucher functionality such that an electronic copy of the ticket/voucher is stored in the back-end system when the ticket/voucher is issued by the gaming machine. Tickets/vouchers allow patrons at a casino to easily move money between machines and to change tickets/vouchers to cash using a cashier or kiosk. When printed or issued, the ticket/voucher state is unpaid and is, essentially, a bearer bond for the patron holding the ticket/voucher. The unpaid ticket/voucher can be inserted into the bill acceptor of a gaming machine and, via interactions with the back-end system, the ticket/voucher can be used to transfer the amount of money represented by the ticket/voucher, to the gaming machine's credit meter. Once the money is transferred to the gaming machine's credit meter, the ticket/voucher is marked as paid in the back-end system so that it cannot be paid more than once.

In some current electronic ticket or voucher systems, a physical ticket or voucher represents a single amount of money. That monetary amount is what was cashed out of a machine when the voucher was issued and the amount of money that will be transferred to the credit meter when the voucher is redeemed.

Embodiments of the present disclosure provide a new ticket/voucher type capable of assuming at least a second monetary value. In some embodiments, a first monetary value is the amount of money that is originally cashed out of the gaming when the ticket/voucher was issued. In some embodiments, a second monetary value is what is to be paid when the ticket/voucher is redeemed. The second monetary value does not need to be the same value as the first monetary value. Furthermore, the first monetary value doesn't need to represent a cash out (e.g., represent the credit meter value at the time of printing the ticket/voucher) since when a player places a sports wager, that player may wish to get the ticket/voucher associated with their wager but continue playing the gaming device with the balance of their remaining credits. Associated with the ticket/voucher may be a number of controlling states. A first state of the ticket/voucher may correspond to an original state when the voucher is issued and is in an "unpaid" state in today's ticketing/vouchering systems. To support the secondary monetary value on a ticket/voucher, embodiments of the present disclosure provide a new middle state that controls whether a voucher is ready for redemption. This middle state could be considered "payable" state indicating that the ticket/voucher is ready to be redeemed. It is expected that the ticket/voucher will become payable when the back-end system or another entity interacting with the back-end system updates the second monetary value on the ticket/voucher and indicates the ticket/voucher is payable. A third state for the ticket/voucher may correspond to a paid and final state for the ticket/voucher.

In some embodiments, additional ticket/voucher states may also be possible and the gaming system may be designed to support those additional states. Examples of such designs may provide a coordination between a sports betting application running on an EGM or portable gaming device and a sports betting system. As a more specific but non-limiting example, the sports betting system may be designed to update the state of a ticket/voucher from an initial "pending" state to an "issued but not redeemable" state. Other possible types of states may also be assumed by a ticket/voucher without departing from the scope of the present disclosure.

Embodiments of the present disclosure will describe the issuance, tracking, and updating of electronic tickets, physical tickets, or vouchers. It should be appreciated that these terms may be used interchangeably and are not intended to limit embodiments of the present disclosure in any way unless explicitly described as such. In some embodiments, an electronic ticket may correspond to an electronic representation of a physical ticket or physical voucher that has been issued by a gaming device. It should be appreciated, however, that a voucher may take on a physical form, electronic form, or a combination thereof. As an example, activities related to a physical ticket or physical voucher may be tracked, mirrored, or updated at an electronic record in a database representing an electronic ticket or electronic voucher that substantially corresponds to a physical ticket or physical voucher.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system according to embodiments of the present disclosure may include one, some, or all of the components depicted in the system 100 and does not necessarily have to include all of the components in a single device. For instance, the components of a server may be distributed amongst a plurality of servers and/or other devices (e.g., an EGM, portable user device, etc.) in the system 100 without departing from the scope of the present disclosure.

The gaming system 100 is shown to include a communication network 104 that interconnects and facilitates machine-to-machine communications between one or multiple gaming devices 108a-N and a gaming server 116. It should be appreciated that the communication network 104 may correspond to one or many communication networks without departing from the scope of the present disclosure. In some embodiments, the various EGMs 108a-N and server(s) 116 may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming devices 108a-N may be distributed throughout a single property or premises (e.g., a single casino floor) or the gaming devices 108a-N may be distributed among a plurality of different properties. In a situation where the EGMs 108a-N are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108a-N may utilize the same or different types of communication protocols to connect with the communication network 104. It should also be appreciated that the gaming devices 108a-N may or may not present the same type of game to a player 112. For instance, the first gaming device 108a may correspond to a gaming machine that presents a slot game to the player 112, the second gaming device 108b may correspond to a video poker machine, and other gaming devices may present other types of games or a plurality of different games for selection and eventual play by the player 112. It may be possible for the some of the gaming devices 108a-N to communicate with one another via the communication network 104. In some embodiments, one or more of the gaming devices 108a-N may only be configured to communicate with a centralized management server and/or the gaming server 116. Although not depicted, the system 100 may include a separate server or collection of servers that are responsible for managing the operation of the various gaming devices 108a-N in the gaming system 100. It should also be appreciated that the gaming server 116 may or may not be co-located with one or more gaming devices 108a-N in the same property or premises. Thus, one or more gaming devices 108a-N may communicate with the gaming server 116 over a WAN, such as the Internet. In such an event, a tunneling protocol or Virtual Private Network (VPN) may be established over some of the communication network 104 to ensure that communications between an EGM and a remotely-located server 116 are secured.

The gaming devices 108a-N may correspond to a type of device that enables player 112 interaction in connection with playing games of chance. A gaming device 108a-N may include any type of known gaming device such as an EGM, a slot machine, a table game, an electronic table game (e.g., video poker), a skill-based game, etc. In addition to playing games on a gaming device 108a-N, the player 112 may also be allowed to interact with and play games of chance on a mobile device 144. A mobile device may correspond to a player's 112 personal device or to a device issued to the player 112 during the player's visit at a particular casino. It should be appreciated that the player 112 may play games directly on their mobile device 144 and/or the mobile device 144 may be in communication with a gaming device 108a-N such that the mobile device 144 provides the interface for the player 112 to the gaming device 108a-N. As shown in FIG. 1, the mobile device 144 may be in communication with the communication network 104 or in direct communication (e.g., via Bluetooth, WiFi, etc.) with a gaming device 108a-N. Non-limiting examples of a mobile device 144 include a cellular phone, a smart phone, a tablet, a wearable device, an augmented reality headset, a virtual reality headset, a laptop, a Personal Computer (PC), or the like.

The gaming server 116 is further shown to include a processor 120, memory 124, and a network interface 128. These resources may enable functionality of the gaming server 116 as will be described herein. For instance, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data into a player profile database 148 and/or voucher/ticket database 152 and retrieve information from the databases. Alternatively or additionally, the player profile database 148 or data stored therein may be stored internal to the server 116 (e.g., within the memory 124 of the server 116 rather than in a separate database). Alternatively or additionally, the voucher/ticket database 152 or data stored therein may be stored internal to the server 116.

The illustrative instruction sets that may be stored in memory 124 include, without limitation, a ticket/voucher management instruction set 132, a player profile management instruction set 136, and a game management instruction set 140. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

In some embodiments, the ticket/voucher management instruction set 132, when executed by the processor 120, may enable the gaming server 116 to manage various tickets/vouchers issued by gaming devices 108a-N, manage ticket/voucher values, determine ticket/voucher states, update the ticket/voucher database 152, obtain information from the ticket/voucher database 152, determine that a ticket/voucher has been redeemed and notify the player profile management instruction set 136, etc. In embodiments where the ticket/voucher instruction set 132 is implemented in one system (e.g., a ticketing/voucher system) and the player profile management instruction set 136 is implemented in a separate system (e.g., a player tracking system), there may or may not be a communication link that exists between the two systems. In such a situation, the tickets/vouchers issued by the ticketing/voucher system may be anonymous and not necessarily associated with any particular player or player profile.

In some embodiments, the ticket/voucher management instruction set 132 is configured to perform any action consistent with the issuance of tickets/vouchers, tracking of ticket/voucher states, and determining whether/when/where a ticket/voucher has been redeemed. In some embodiments, the ticket/voucher management instruction set 132 may be configured to generate, or cause the game management instruction set 140 to generate, a synthesized credit meter for the first gaming device. For instance, as gaming devices 108a-N or a mobile device 144 have their credit meters updated, the gaming server 116 may update a corresponding synthesized credit meter to reflect updates at the credit meters. In some embodiments, values of credit or other events stored in credit meters of devices 108, 144 may be mirrored in a synthesized credit meter maintained by the gaming server 116.

The player profile management instruction set 136, when executed by the processor 120, may enable the gaming server 116 to manage one or more player profiles within the player profile database 148. In some embodiments, the player profile management instruction set 136 may be configured to manage a player loyalty profile including settings for such player profiles, available wager credits for such profiles, determine player wager history, and/or determine which, if any, tickets/vouchers are associated with a particular player. It should also be appreciated that the player profile management instruction set 136 may be configured to manage player profiles of players that do not have loyalty accounts or any other predetermined player account.

The game management instruction set 140, when executed by the processor 120, may enable the gaming server 116 to manage the various games played by a player 112 at the gaming devices 108a-N and/or a mobile device 144 carried by the player 112. In other words, any game played by the player 112 at one or more of the devices 108a-N, 144 may be managed, partially or entirely, by execution of the game management instruction set 140. The game management instruction set 140 may also be configured to track a status of wager events (e.g., sporting events, bingo, keno, lottery, etc.) and whether a player 112 has placed a wager on such events. In some embodiments, when a wager event has come to completion such that wagers made on the event become payable (e.g., at the end of a sporting event when the final score of the event is determined), the game management instruction set 140 may notify the ticket/voucher management instruction set 132, thereby enabling the ticket/voucher management instruction set 132 to update states and/or values of tickets/vouchers issued for the event appropriately.

Figure 2:
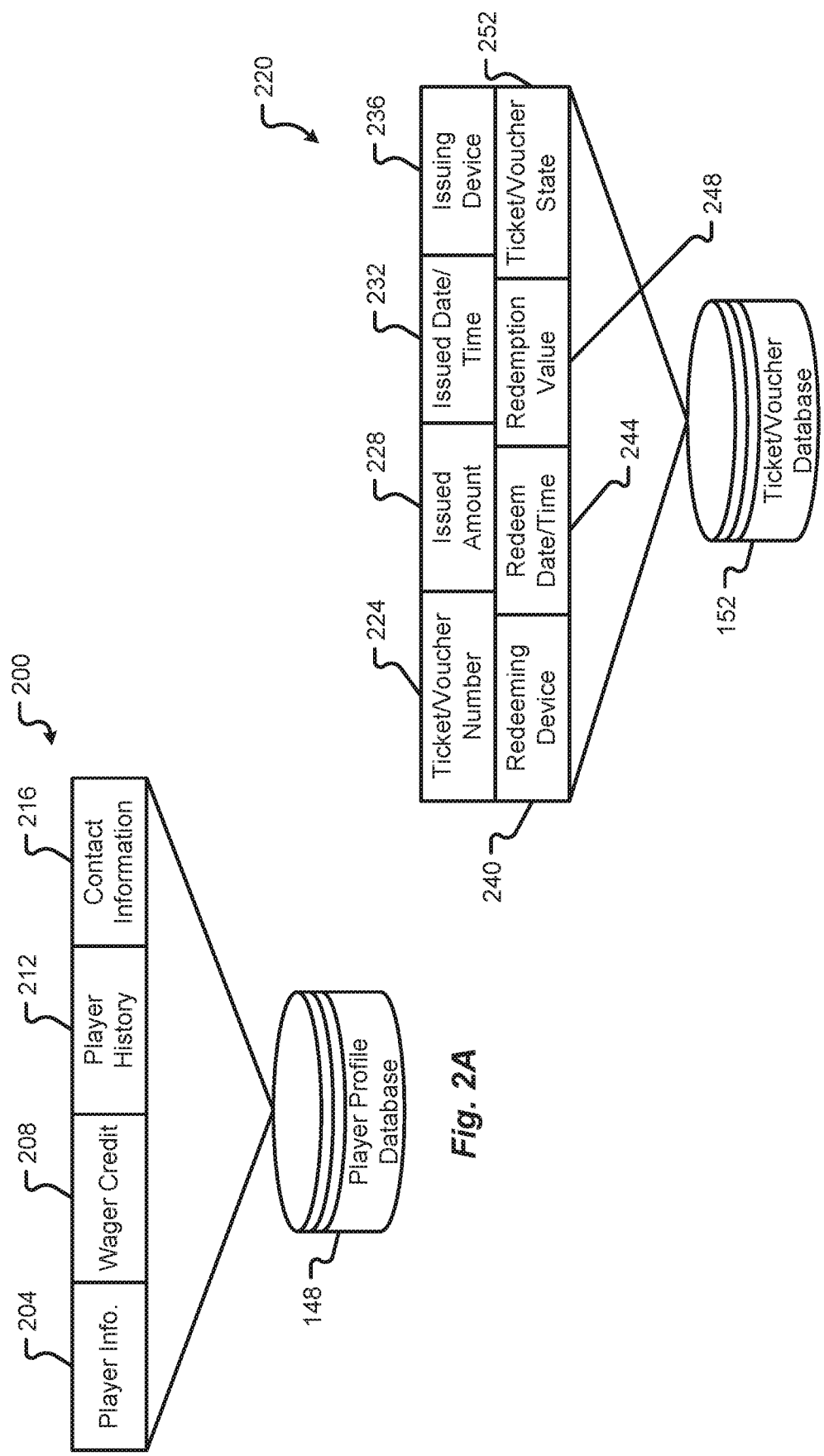
FIG. 2A is a block diagram depicting a first illustrative data structure used in accordance with embodiments of the present disclosure.
FIG. 2B is a block diagram depicting a second illustrative data structure used in accordance with embodiments of the present disclosure.

With reference now to FIGS. 2A and 2B, additional details of data structures that are useable in connection with managing ticket/voucher state and value will be described in accordance with at least some embodiments of the present disclosure. It should be appreciated that the data structures depicted and described herein may be stored within a central database or may be distributed among a number of data storage nodes. Alternatively or additionally, some or all of the fields of the data structures may be maintained in devices of the gaming system 100 such as the gaming server 116, a gaming device 108, and/or a mobile device 144 without departing from the scope of the present disclosure.

With reference initially to FIG. 2A, details of a data structure 200 that may be maintained as part of a player profile will be described in accordance with at least some embodiments of the present disclosure. The database 148 may be configured to store one or multiple data structures 200 that are used in connection with tracking player progress and gaming history. In some embodiments, the data stored in the data structure 200 may be stored for a plurality of different player profiles or for a single player profile. As a non-limiting example, the data structure 200 may be used to store player loyalty information, player history information, and the like. Even more specifically, the data structure 200 may include a plurality of data fields that include, for instance, a player information field 204, a wager credit field 208, a player history field 212, and a contact information field 216.

The player information field 204 may be used to store any type of information that identifies a player or a group of players. In some embodiments, the player information field 204 may store one or more of username information for a player 112, password information for a player account, player status information, accommodations associated with the player 112, and any other type of customer service management data that may be stored with respect to a player 112.

The wager credit field 208 may be used to store data about a player's 112 available credit with a device, with a sports book, with a casino, and/or with a plurality of casinos. For instance, the wager credit field 208 may store an electronic record of available credit in the player's account and whether any restrictions are associated with such credit. The wager credit field 208 may further store information describing a player's available credit over time, cash out events for the player, winning events for the player, wagers placed by the player, tickets/vouchers issued to the player, and the like.

The player history field 212 may be used to store historical data for events that occur with respect to the player 112. For instance, the player history field 212 may store information related to a player's 112 outcome in a game of chance, a player's 112 outcome in a game of skill, a celebration event for a person other than the player 112, a player's 112 involvement in a celebration event, a player 112 visiting a predetermined location, a player 112 playing a particular game, a player interacting with their mobile device 144, wagers placed by the player 112, tickets/vouchers issued for the player 112, tickets/vouchers redeemed by the player 112, etc.

The contact information field 216 may store information associated with a player's 112 preferred modes of contact and how such contact can be made. For instance, the contact information field 216 may store information such as an email address, phone number, room number, player loyalty number, address, etc.

With reference now to FIG. 2B, details of another data structure 220 that may be used within the gaming system 100 will be described in accordance with at least some embodiments of the present disclosure. The database 152 may be configured to store one or multiple data structures 220 that are used in connection with tracking ticket/voucher status, value, and the like. In some embodiments, the data stored in the data structure 220 may be stored for a plurality of different tickets/vouchers and may or may not be organized based on events, player association, etc. As a non-limiting example, the data structure 220 may be used to store ticket/voucher status information, ticket/voucher value information, and the like. Even more specifically, the data structure 220 may include a plurality of data fields that include, for instance, a ticket/voucher number field 224, an issued amount field 228, an issued date/time field 232, an issuing device field 236, a redeeming device field 240, a redeem date/time field 244, a redemption value field 248, and a ticket/voucher state field 252. It should be appreciated that the data structure 220 may have greater or fewer fields than depicted in FIG. 2B.

The ticket/voucher number field 224 may be used to store a unique validation number assigned to the ticket/voucher when a ticket/voucher is issued to a player 112. In some embodiments, the data stored in the ticket/voucher number field 224 may be randomly generated, pseudo-randomly generated, or sequentially generated based on when the ticket/voucher is issued. In some embodiments, the validation number assigned to the ticket/voucher may be unique to the ticket/voucher within the gaming system 100 (e.g., at least unique as to any other ticket/voucher issued within the gaming system 100). While numeric values may be used for the validation number, it should be appreciated that any alphanumeric string may be used for the validation number stored in the ticket/voucher number field 224.

The issued amount field 228 may be used to store an electronic record of a monetary value for which the particular ticket/voucher was issued. The issued amount field 228 may correspond to a data field that is written once and not updated. Thus, even when an associated ticket/voucher transitions from the issued state to another state, the value recorded in the issued amount field 228 may be left unchanged. Likewise, the information stored in the issued date/time field 232 and issuing device field 236 may also be written once and not changed thereafter. The issued date/time field 232 may store information describing when a ticket/voucher is issued whereas the issuing device field 236 may store information describing where a ticket/voucher is issued. For instance, the issuing device field 236 may indicate a unique serial number assigned to a gaming device 108 that was used to issue the ticket/voucher to the player 112 and the issued date/time field 232 may store the time at which the ticket/voucher was issued by the gaming device 108. In some embodiments, the date/time field 232 may be populated based on a clock of the gaming device 108 that issued the ticket/voucher rather than relying on the clock of the gaming server 116. Said another way, when a gaming device 108 issues a ticket/voucher, such information may be communicated back to the gaming server 116 along with a timestamp provided by the gaming device 108 to indicate a time at which the gaming device 108 issued the ticket/voucher. Using the time indicated by the gaming device 108 can help account for or avoid problems associated with delays in communication over the communication network 104. One such possible problem would be having a wagered event (e.g., a sporting event) come to completion while the communication network 104 is down or unavailable and before the gaming server 116 becomes aware of an issued ticket/voucher by a gaming device 108. Of course, it may also be possible or desirable to use the clock of the gaming server 116 as the centralized authority on all date/times entered into the field 232, thereby avoiding the need to synchronize or consideration synchronization issues between various gaming devices 108a-N.

Like the issuing device field 236, the redeeming device field 240 may be used to store information describing a device at which a ticket/voucher is redeemed by a player 112. In some embodiments, a redeeming device may correspond to a gaming device 108a-N or a mobile device 144. A player 112 may be allowed to redeem a ticket/voucher at a gaming device 108 by inserting a printed ticket/voucher into a ticket acceptance device of the gaming device 108 (e.g., similar to a bill acceptor). A player 112 may be allowed to redeem a ticket/voucher at a mobile device 144 by scanning the ticket/voucher with a camera of the mobile device 144 and transmitting information obtained from the scan of the ticket/voucher back to the gaming server 116 as proof of redemption. Thus, the redeeming device field 240 may store information uniquely describing the device used by the player 112 to redeem a ticket/voucher (e.g., an address or device ID). Alternatively or additionally, the redeeming device field 240 may store information describing a type of device that was used for redemption (e.g., whether the device is a gaming device 108 or a mobile device 144)

The redemption date/time field 244, similar to the issued date/time field 232, may be used to store data and/or time information for the ticket/voucher. However, the redemption date/time field 244 may be used to store a date/time when a ticket/voucher is redeemed as opposed to when the ticket is issued. Again, the time indicated in the field 244 may be based on a timestamp issued by the redeeming device and/or a clock of the gaming server 116. The date/time provided in the data field 244 may correlate to a date/time when the state of the ticket transitions within the ticket/voucher state field 252. Thus, when the electronic record of the data field 252 is updated, a change to the date/time in field 244 may also be made at substantially the same time. As will be discussed in further detail herein, the ticket/voucher state field 252 may be used to store state or status information for a ticket/voucher and the state within the field 252 may be capable of having at least three different values (e.g., issued, redeemable, and redeemed). Other possible values for the state of the ticket/voucher may include, without limitation, a pending state, which may correspond to a state between the issued state and the redeemable state where a wagered event has come to completion but the redeemable value of the ticket/voucher is still being determined and/or considered.

The redemption value field 248 may be used to store an electronic record indicating an amount for which a ticket/voucher may be redeemed (e.g., a redeemable value) and/or an amount for which a ticket/voucher is actually redeemed (e.g., a redeemed/redemption amount). In embodiments where the redeemable value is the same as the redeemed/redemption value, there may only need to be a single data field 248 to store the redemption value for the ticket/voucher. In some embodiments, it may also be desirable to have separate data fields to store a redeemable value for a ticket/voucher and then a redeemed/redemption value for the ticket/voucher. The redeemable value for a ticket/voucher may be determined by the gaming server 116 as soon as the wagered event for which the ticket/voucher is associated has come to completion whereas the redemption value may be determined by the gaming server 116 when the ticket/voucher is redeemed. Again, the redemption value may be the same as or different from the redeemable value without departing from the scope of the present disclosure.

Figure 3:
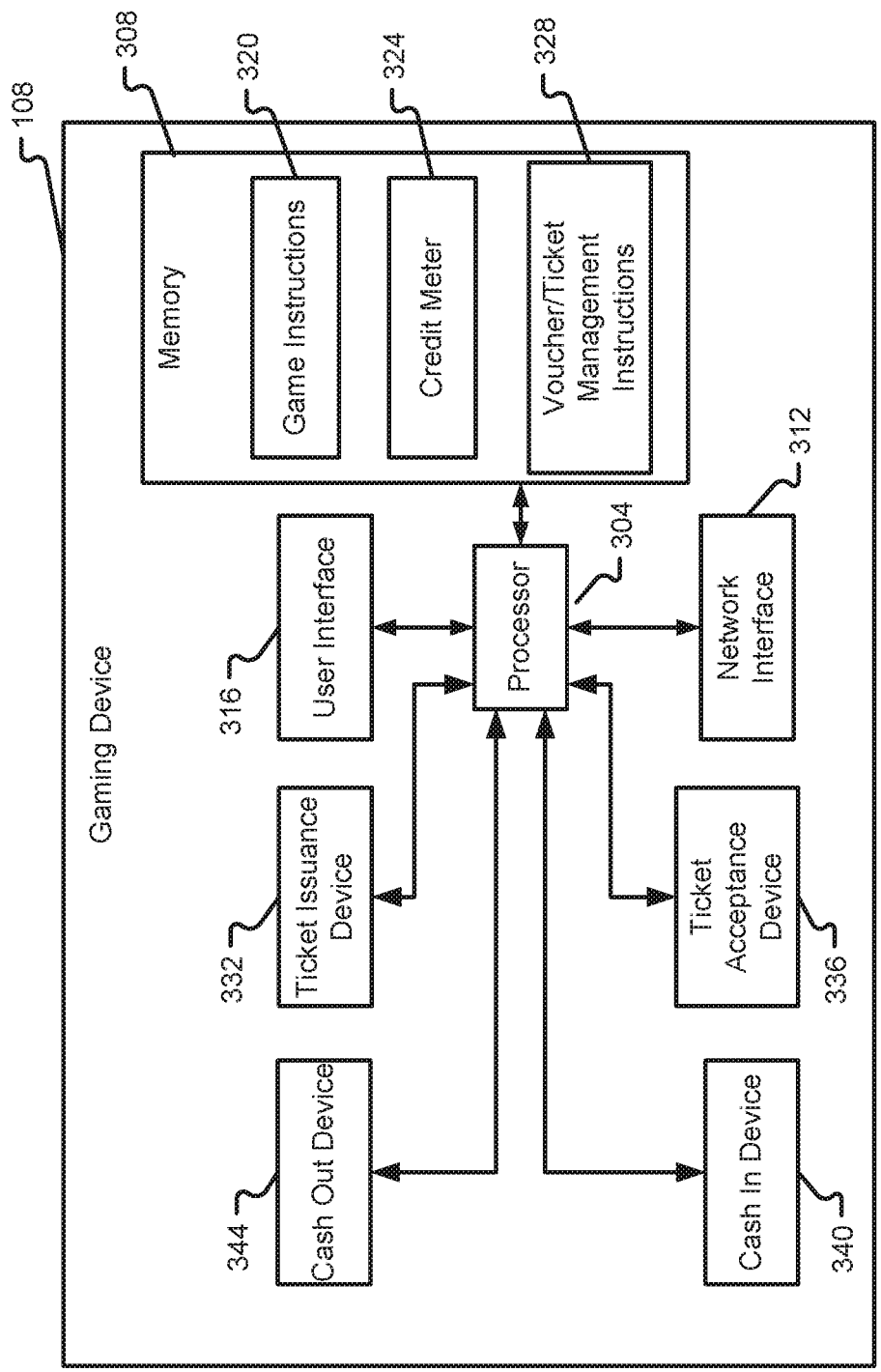
FIG. 3 is a block diagram depicting an illustrative gaming device in accordance with embodiments of the present disclosure.

With reference now to FIG. 3, additional details of a gaming device 108 will be described in accordance with at least some embodiments of the present disclosure. While depicted as a gaming device 108, it should be appreciated that some or all of the components of the gaming device 108 may be included in a player's 112 mobile device 144 without departing from the scope of the present disclosure.

The gaming device 108 is depicted to include a processor 304, memory 308, a network interface 312, a user interface 316, a ticket issuance device 332, a ticket acceptance device 336, a cash in device 340, and a cash out device 344. In some embodiments, the processor 304 may be similar or identical to the processor 120. In other words, the processor 304 may correspond to one or many microprocessors, CPUs, microcontrollers, or the like. The processor 304 may be configured to execute one or more instruction sets stored in memory 308.

The network interface 312 may also be similar or identical to network interface 128. The nature of the network interface 312, however, may depend upon whether the network interface 312 is provided in a gaming device 108 or a mobile user device 144. Examples of a suitable network interface 312 include, without limitation, an Ethernet port, a USB port, an RS-232 port, an RS-485 port, a NIC, an antenna, a driver circuit, a modulator/demodulator, etc. The network interface 312 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 316 may correspond to any type of input and/or output device that enables the player 112 to interact with the gaming device 108. As can be appreciated, the nature of the user interface 316 may depend upon the nature of the gaming device 108. For instance, if the gaming device 108 is a traditional mechanical reel slot machine, then the user interface 316 may include one or more mechanical reels with symbols provided thereon, one or more lights or LED displays, one or more depressible buttons, a lever or "one armed bandit handle", a speaker, or combinations thereof. If the gaming device 108 is a digital device, then the user interface 316 may include one or more touch-sensitive displays, LED/LCD display screens, etc.

The memory 308 may be similar or identical to memory 124. For instance, the memory 308 may include one or multiple computer memory devices that are volatile or non-volatile. The memory 308 may be configured to store instruction sets that enable player interaction with the gaming device 108, that enable game play at the gaming device 108, and/or that enable coordination with the gaming server 116. Examples of instruction sets that may be stored in the memory 308 include a game instruction set 320, a credit meter 324, and a ticket/voucher management instruction set 328.

In some embodiments, the game instructions 320, when executed by the processor 304, may enable the gaming device 108 to facilitate one or more games of chance or skill and produce interactions between the player 112 and the game of chance or skill. In some embodiments, the game instructions 320 may include subroutines that present one or more graphics to the player 112 via the user interface 316, subroutines that calculate whether a particular wager has resulted in a win or loss during the game of chance or skill, subroutines for determining payouts for the player 112 in the event of a win, subroutines for exchanging communications with a connected server (e.g., game management server, gaming server 116, or the like), subroutines for enabling the player 112 to engage in a game using their mobile user device 144, and any other subroutine or set of instructions that facilitate gameplay at or in association with the gaming device 108.

The credit meter 324 may correspond to a secure instruction set and/or data structure within the gaming device 108 that facilitates a tracking of activity at the gaming device 108. In some embodiments, the credit meter 324 may be used to store or log information related to various player 112 activities and events that occur at the gaming device 108. The types of information that may be maintained in the credit meter 324 include, without limitation, player information, available credit information, wager amount information, and other types of information that may or may not need to be recorded for purposes of accounting for wagers placed at the gaming device 108 and payouts made for a player 112 during a game of chance or skill played at the gaming device 108. In some embodiments, the credit meter 324 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the credit meter 324 may be updated in response to outcomes of a game of chance or skill played at the gaming device 108. In some embodiments, the credit meter 324 may be updated depending upon whether the gaming device 108 is issuing a ticket/voucher, being used as a point of redemption for a ticket/voucher, and/or any other activity associated with a ticket/voucher. Some or all of the data within the credit meter 324 may be reported to the gaming server 116, for example, if such data applies to a centrally-managed game and/or a status of a ticket/voucher. As an example, the number, value, and timing of wagers placed by a particular player 112 and payouts on such wagers may be reported to the gaming server 116.

Activities of the gaming device 108 related to ticket/voucher activity may be managed and reported by the ticket/voucher management instruction set 328. In some embodiments, when a ticket/voucher is redeemed at the gaming device 108 by the player 112, information associated with the ticket/voucher may be obtained by the ticket/voucher management instruction set 328 and reported to the gaming server 116. Furthermore, the ticket/voucher management instruction set 328 may be configured to update the credit meter 324 if the redeemed ticket/voucher is determined to be in a redeemable state and has a redeemable or redemption value associated therewith. In some embodiments, the credit meter 324 may be updated or incremented by the redeemable or redemption value of the ticket/voucher when redeemed. This information may be obtained directly from the ticket/voucher or may require some interactions with the gaming server 116 prior to updating the credit meter 324.

Because the gaming device 108 may be used for the acceptance and issuance of tickets/vouchers, the gaming device 108 may be provided with appropriate hardware to facilitate such acceptance and issuance. Specifically, the gaming device 108 may be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a physical ticket acceptor, a shredder, etc. The ticket acceptance device 336 may be configured to accept physical tickets and/or electronic tickets without departing from the scope of the present disclosure. An electronic ticket/voucher may be accepted by scanning a one-dimensional barcode, two dimensional barcode, or other type of barcode or quick response (QR) code displayed by a player's 112 mobile device 144, for example.

The ticket issuance device 332 may be configured to print or provide physical tickets/vouchers to players 112. In some embodiments, the ticket issuance device 332 may be configured to issue a ticket/voucher consistent with an amount of credit available to a player 112, possibly as indicated within the credit meter 324.

The cash in device 340 may include a bill acceptor, a coin acceptor, a chip acceptor or reader, or the like. In some embodiments, the cash in device may also include credit card reader hardware and/or software. The cash out device 344, like the ticket issuance device 322, may operate and issue cash, coins, tokens, or chips based on an amount indicated within the credit meter 324. In some embodiments, the cash out device 344 may include a coin tray or the like and counting hardware configured to count and distribute an appropriate amount of coins or tokens based on a player's 112 winnings or available credit within the credit meter 324.

Figure 4:
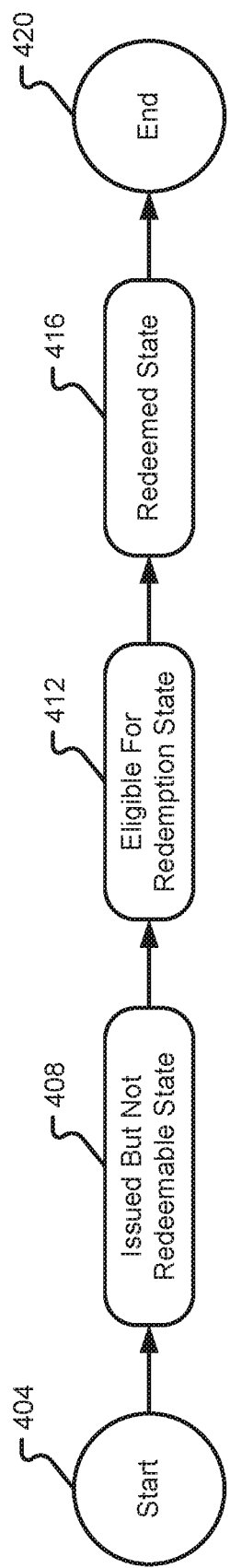
FIG. 4 is a block diagram depicting electronic ticket states in accordance with embodiments of the present disclosure.

With reference now to FIG. 4, an illustrative state diagram associated with a ticket/voucher will be described in accordance with at least some embodiments of the present disclosure. The state of a ticket/voucher may be tracked and managed by a gaming server 116 and/or by some other system responsible for tracking a status of wagers made and appropriate winning values for such wagers. Although not depicted, the system responsible for tracking a status of wagers made and appropriate winning values for such wagers may be separate from the gaming server 116, in which case communications between the gaming server 116 and the wager tracking system may be facilitated by the communication network 104. It may also be possible to maintain a state of a ticket/voucher at a mobile device 144, at a gaming device 108, or the like (e.g., in a memory associated with the mobile device, gaming device 108, etc.).

The state of a ticket/voucher begins at a start state 404 and moves to an issued but not redeemable state 408. This state may correspond to a time where a player 112 has placed a wager on a wagerable event (e.g., a sporting event, a game of chance, a game of skill, etc.), but the outcome of the wagerable event has not been determined or completed. When the ticket/voucher is in the issued but not redeemable state 408, the ticket/voucher may have a first value associated therewith (e.g., an issued value). This information may be stored within the data structure 220 as appropriate.

The ticket/voucher is then capable of transitioning to an eligible for redemption state 412. In the eligible for redemption state 412, the ticket/voucher may have a second value associated therewith (e.g., a redeemable value). This information may be stored within the data structure 220 as appropriate. It should be appreciated that the redeemable value of a ticket/voucher may not necessarily be the same as the issued value of the ticket/voucher. Specifically, the redeemable value of a ticket/voucher may be dependent upon the outcome of the wagerable event and/or other considerations. In some embodiments, the redeemable value of a ticket/voucher depends upon the outcome of the wagerable event as well as the wagered amount, which may or may not be the same as the issued value. In some embodiments, the ticket/voucher information maintained at the gaming server 116 may enter into the eligible for redemption state 412 upon the gaming server 116 receiving notification from a wager tracking system (e.g., a sports betting system) that the wagered event has concluded along with an outcome of the wagered event.

The ticket/voucher is then capable of transitioning to a redeemed state 416. In the redeemed state, the ticket/voucher may have a third value associated therewith (e.g., a redeemed value). This information may be stored within the data structure 220 as appropriate. It should also be appreciated that the redeemed value of a ticket/voucher may or may not be the same as the redeemable value of the ticket/voucher. In some embodiments, the redeemed state may be considered a "paid" state for the ticket/voucher, which may correspond to a terminal or final state 420 of the ticket/voucher. As noted above, times at which such state transitions occur may be stored within the data structure 220 along with devices used to affect such transitions and the associated value(s) of the ticket/voucher when such transitions occurred.

In some embodiments, state transitions can be realized in more than one way. In some embodiments, the ticket/voucher is in the issued state in the server 116 when the gaming device 108 reports the ticket/voucher as issued. It may not be necessary to take a redemption attempt for the ticket/voucher to move to the issued state. In one model, the redemption amount (e.g., the second value of the ticket/voucher) may be updated on the server 116 (e.g., upon conclusion of a sporting event, upon conclusion of a wagerable event, etc.) and the ticket/voucher can finally be redeemed. Once redeemed, the ticket/voucher may then transition to the redeemed state. In another model, the server 116 could reach out and request the second value from a separate sports betting system on a redemption attempt by a player 112, and if the sports betting system says that the secondary value is now known, then the server 116 will allow the ticket/voucher to be redeemed (e.g., move the state to a redeemable state) for the redemption amount value obtained from the sports betting system.

In some embodiments, where a separate ticketing/voucher system is used to support sports betting, for example, the gaming server 116 may be configured to reach out to the separate ticketing/voucher system to determine the second value for a ticket/voucher, or the ticketing/voucher system could push the redeemable value to the gaming server 116.

In some embodiments, the ticket/voucher may be issued with a first electronic ticket value associated with an issued state of the ticket/voucher. The server 116 may then update an electronic record for the ticket/voucher to include the first electronic ticket value. Later on, the server 116 may update the electronic record for the ticket/voucher to include a state of issued but not redeemable and then set a second value associated with the electronic ticket record which represents the redemption value of the ticket/voucher. The server 116 may further update the state of the ticket/voucher as eligible for redemption. Thereafter, as the ticket/voucher is being redeemed, the server 116 may update the electronic record for the ticket/voucher to indicate that the ticket/voucher has entered the redeemed state. The value of the ticket/voucher within the electronic record may also be updated accordingly, if necessary.

In some embodiments, if a ticket/voucher assumes a redeeming value of zero, then the ticket/voucher can be marked as redeemed or left in a redeemable state. This can be done either by the gaming server 116 or by a separate sports betting system. Such a scenario may result in a number of different possibilities. For instance, if a ticket/voucher with a redeem value of zero is not marked as redeemed when the redeem value is set, the gaming device may stack the ticket/voucher and the ticket/voucher will get marked redeemed by the system as usual. If a ticket/voucher with a redeem value of zero is marked as redeemed when the redeem value is set, the gaming device may not stack the ticket/voucher and the ticket/voucher will get marked redeemed by the system as usual. Another aspect is that it might be useful to mark zero redeem value tickets/vouchers as redeemed from a system maintenance perspective allowing the system 100 to archive those tickets off, thus shrinking the number of entries within the ticket/voucher database 152.

Figure 5:
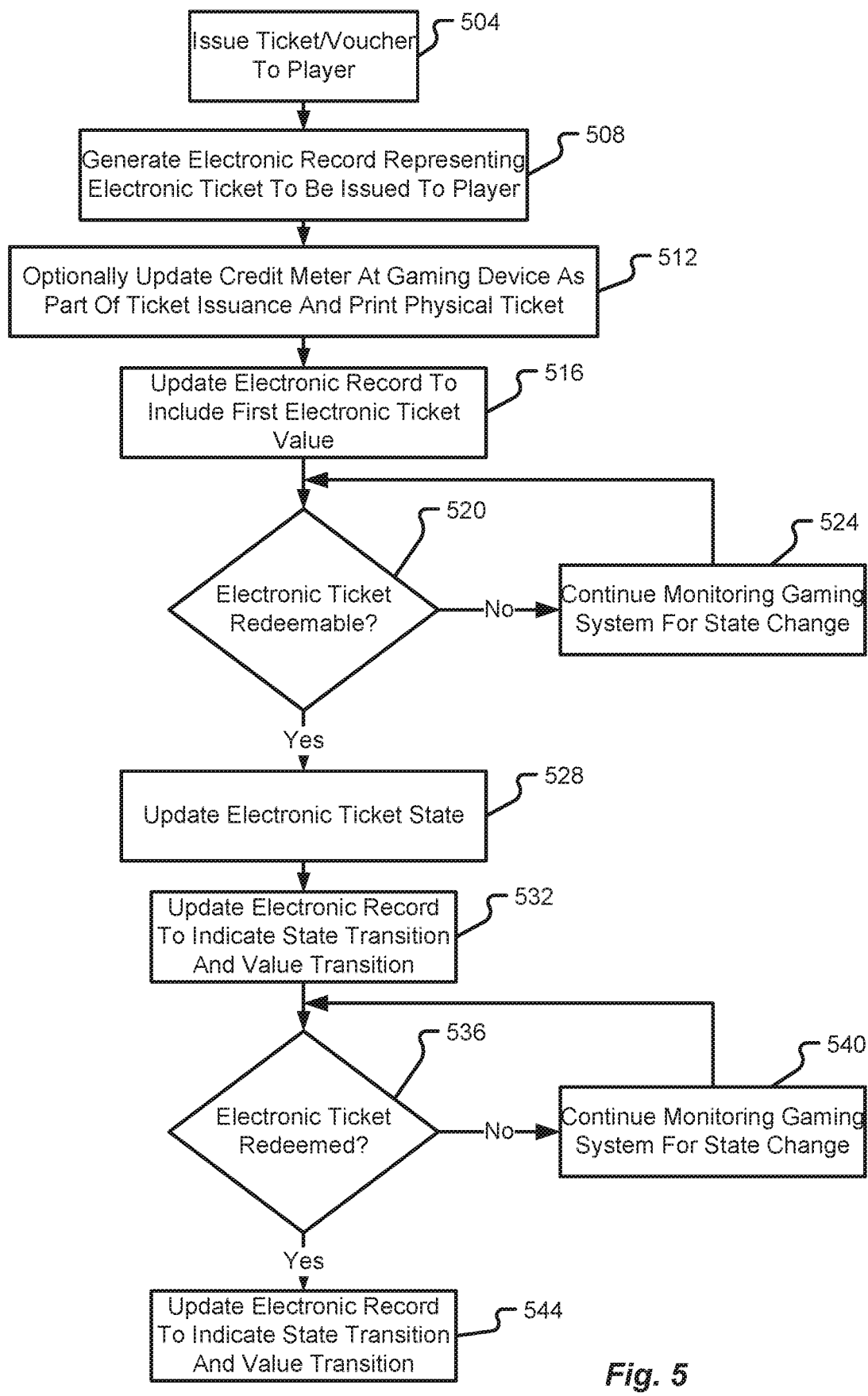
FIG. 5 is a flow diagram depicting a method of managing an electronic ticket in accordance with embodiments of the present disclosure.

With reference now to FIG. 5, a first method of managing tickets/vouchers will be described in accordance with at least some embodiments of the present disclosure. The method begins when a ticket/voucher is issued to a player 112 (step 504). In some embodiments, the ticket/voucher is issued in response to the player 112 placing a wager on a wagered event and possibly in response to the player 112 requesting a ticket/voucher for the wager placed.

The method continues by generating an electronic record representing the electronic ticket/voucher to be issued to the player (step 508). In some embodiments, this step may include generating a new entry within the ticket/voucher database 152 and generating a new ticket/voucher number for the ticket/voucher to be issued to the player 112. Appropriate data fields within the data structure 220 may also be created in this step.

The method continues by optionally updating a credit meter 324 of a gaming device that is used to issue the ticket/voucher and/or printing a physical ticket/voucher that is representative of the electronic ticket/voucher (step 512). In some embodiments, the step of updating a credit meter 324 may only be necessary where the player 112 is using a gaming device 108 or mobile device 144 to place the wager. In situations where a device not having a credit meter 324 is used to accept the player's 112 wager and issue the ticket/voucher, it may not be necessary to update the credit meter and/or print a physical ticket as part of the ticket/voucher issuance.

The method continues by updating the electronic record to include the first value of the ticket/voucher (step 516). In some embodiments, this step includes updating the issued amount field 228, issued date/time field 232, and issuing device field 236. Specifically, the issued amount field 228 may be written with a value representing the issued value of the ticket/voucher. The issued value may be determined at the time of wager placement and/or at the time of ticket/voucher issuance.

The method then continues by monitoring the progress of the wagered event to determine if the ticket/voucher has become redeemable (step 520). In some embodiments, this monitoring occurs at the gaming server 116. In some embodiments, this monitoring occurs as a separate tracking system, which then reports updates in ticket/voucher state to the gaming server 116. As long as the query of step 520 is answered negatively, the status of the ticket/voucher will continue to be monitored for a state change (step 524). During this time, the ticket/voucher may be considered to have the issued but not redeemable state 408 status.

Once it is determined that the ticket/voucher has become redeemable, the method continues by updating the associated state of the ticket/voucher (step 528). This may occur by writing an appropriate state value within data field 252. In some embodiments, the ticket/voucher may transition to the eligible for redemption state 412 after the query of step 520 is answered affirmatively. Subsequent to or in parallel with step 528, the method may also include updating the data structure 220 to indicate the ticket/voucher's new value (step 532). Specifically, in some embodiments, the ticket/voucher may be updated to have a redeemable value, which may or may not be different from the issued value of the ticket/voucher. In some embodiments, the redeemable value of the ticket/voucher may depend upon the amount of the wager placed by the player 112 and an outcome of the wagered event.

After the ticket/voucher has entered the redeemable state 412, the method continues with the gaming server 116 further monitoring activity within the system 100 to determine if the ticket/voucher has been redeemed (step 536). If this query is answered negatively, then the ticket/voucher will remain in the eligible for redemption state and the gaming server 116 will continue monitoring the system 100 (step 540). If the query of step 536 is answered affirmatively, then the method continues by further updating the data structure 220 to indicate the further ticket/voucher state transition (step 544). This step may further indicate updating the ticket/voucher's associated redeemed value. The redeemed value of a ticket/voucher may be the same as or different from the redeemable value of the ticket/voucher. At this point in time, all appropriate data fields of the data structure 220 may be populated and the fields for the ticket/voucher may be marked to ensure that the ticket/voucher is not capable of being redeemed a second time.

Figure 6:
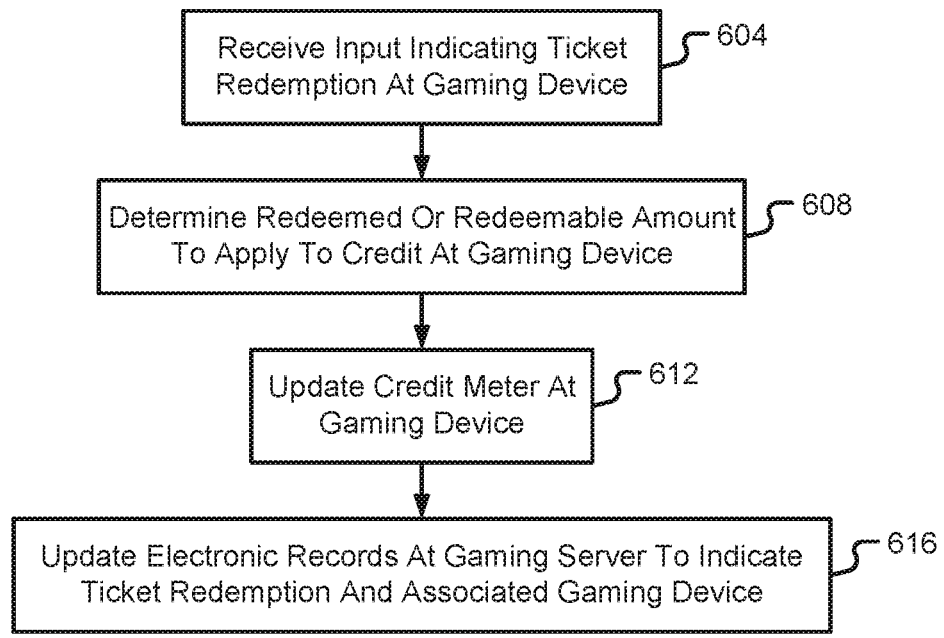
FIG. 6 is a flow diagram depicting a further method of managing an electronic ticket in accordance with embodiments of the present disclosure.

With reference now to FIG. 6, another method of ticket/voucher management will be described in accordance with at least some embodiments of the present disclosure. The method begins by receiving an input at a gaming server 116 that a ticket/voucher has been redeemed at a gaming device 108 or mobile device 144 (step 604). Upon receiving this indication, the gaming server 116 may invoke the ticket/voucher management instruction set 124 to determine a redeemable or redeemed value for the ticket/voucher (step 608). This information may be communicated back to the gaming device 108 or mobile device 144 as appropriate, thereby enabling the gaming device 108 or mobile device 144 to update an associated credit meter 324 (step 612). The credit meter 324 will then be updated by the redeemable and/or redeemed value of the ticket/voucher.

The method may also include updating electronic records at the gaming server 116 to reflect the update at the credit meter 324 (step 616). In some embodiments, the gaming server 116 is configured to update the data structure 220 with any appropriate information to reflect the redemption of the ticket/voucher, the identity of the gaming device 108 or mobile device 144 used for redemption, timing of redemption, etc. The gaming server 116 may also cause the ticket/voucher's associated data structure 220 to be secured from further updates or rewrites.

Figure 7:
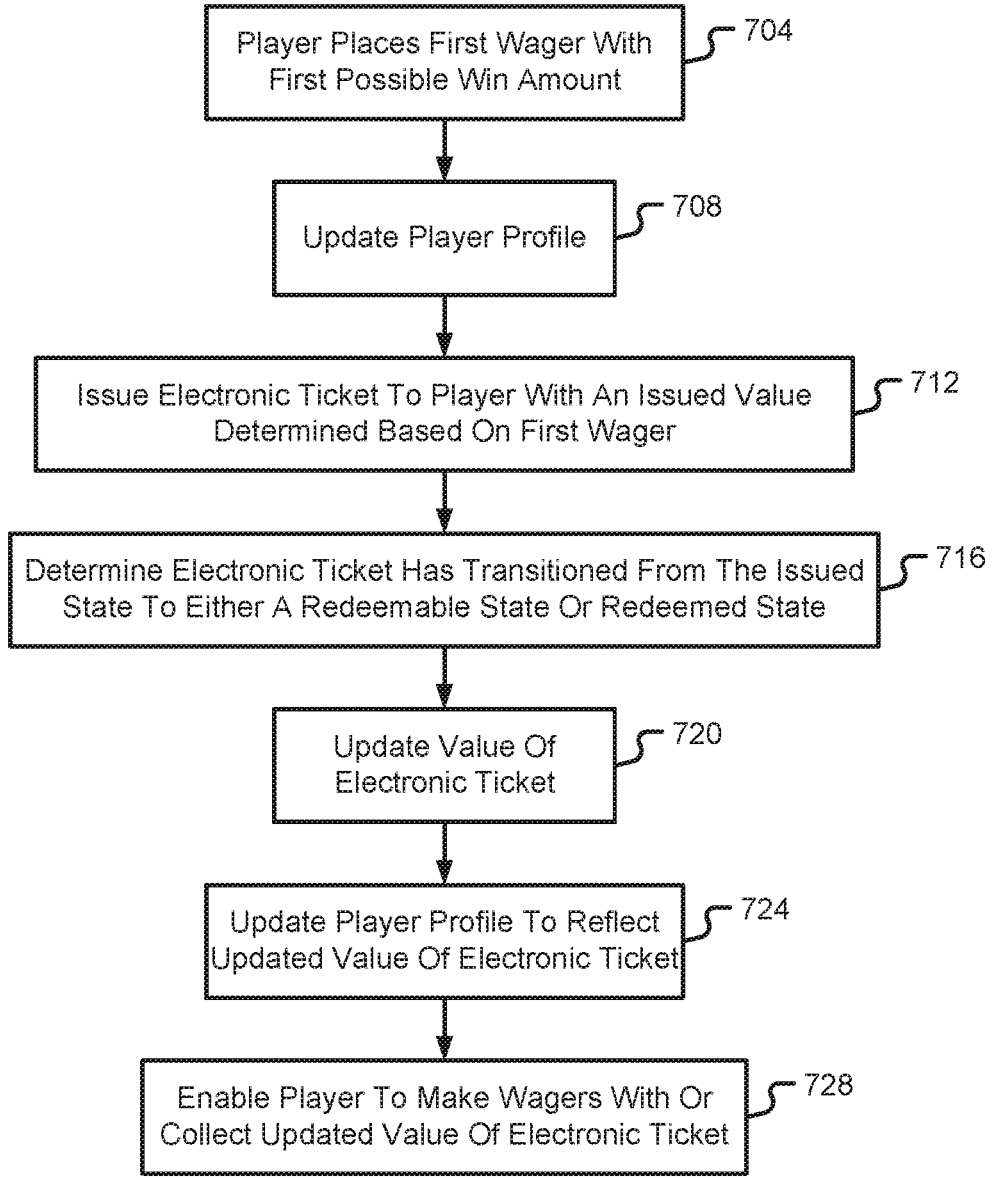
FIG. 7 is a flow diagram depicting a further method of managing an electronic ticket in accordance with embodiments of the present disclosure.

With reference now to FIG. 7, another method of ticket/voucher management will be described in accordance with at least some embodiments of the present disclosure. The method begins when a player 112 places a first wager with a first possible win amount associated therewith (step 704). In some embodiments, the possible win amount for a wager placed by the player 112 may depend upon an outcome of the wagered event (e.g., an outcome of a sporting event, an outcome of a game of chance, an outcome of a celebration event, etc.). The method continues by optionally updating a player profile for the player 112 to indicate information associated with the wager placed (step 708). For instance, a wager credit field 208 and/or player history field 212 may be updated to reflect the first wager placed by the player 112. In some embodiments, the log of historical wagers could be maintained separately from the player's profile within a server managing wagers.

The method continues by issuing a ticket/voucher to the player 112 with a first value associated therewith (step 712). In some embodiments, the first value of the ticket/voucher corresponds to an issued value and may be determined based on the amount of the first wager placed by the player 112. These updates may be made by writing appropriate data into the data structure 220 for the issued ticket/voucher.

The method then continues when it is determined that the ticket/voucher has transitioned from the issued state to either a redeemable state or a redeemed state (step 716). The new value of the ticket/voucher may also be determined in this step and the new, updated, value of the ticket/voucher may be determined as a redeemable or redeemed value for the ticket. The update to the value of the ticket/voucher may be performed by updating the data structure 220 (step 720).

When the value of the ticket/voucher is updated to reflect the redeemable or redeemed amount of the ticket/voucher, the method may further continue by updating the player profile to also reflect the redeemable or redeemed amount of the ticket/voucher (step 724). In some embodiments, this update is made at the data structure 200 and may be performed with the assistance of the player profile management instruction set 136. The update made to the player's profile may enable the player 112 to make wagers with or collect the updated value of the ticket/voucher (step 728). For instance, if the player 112 redeemed their ticket at a gaming device 108, then the player 112 may be allowed to make wagers at the gaming device 108 using the updated value of the ticket/voucher, which may correspond to the redeemable value or redeemed value of the ticket/voucher. Enabling the player 112 to place wagers with the gaming device 108 may also involve updating a credit meter 324 of the gaming device 108 as appropriate.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method of managing award distribution in a gaming system, the method comprising:

receiving, at a gaming server, an input that indicates a player's desire to have a ticket issued by a first gaming device;

generating, at the gaming server, an electronic record representing an electronic ticket to be issued or having already been issued by the first gaming device;

causing the first gaming device to update a first credit meter as part of issuing the electronic ticket to the player, wherein the first credit meter comprises a secure data structure within the first gaming device that tracks activity at the first gaming device including wagers placed at the first gaming device and payouts made at the first gaming device during a game of chance or skill played at the first gaming device, wherein the electronic ticket is issued with a first electronic ticket value associated with an issued state of the electronic ticket, wherein the electronic ticket is issued at a first time and has an association with an event ending at a second time later than the first time, wherein the electronic ticket in the issued state is not redeemable until at least the second time, and wherein a balance of one or more credits remain on the first credit meter following the electronic ticket being issued to the player thereby allowing the player to continue playing the first gaming device with the balance of the one or more credits;

updating, at the gaming server, the electronic record to include the first electronic ticket value;

updating, at the gaming server at the second time, the electronic record to indicate that the electronic ticket has transitioned from the issued state into a redeemable state;

maintaining the electronic record to indicate that the electronic ticket is in the redeemable state until determining that the electronic ticket is being redeemed or has been redeemed;

determining, at the gaming server after the second time, that the electronic ticket is being redeemed or has been redeemed;

in response to determining that the electronic ticket is being redeemed or has been redeemed, updating the electronic record to indicate that the electronic ticket has transitioned from the redeemable state into a redeemed state, wherein the electronic record is also updated to indicate that the electronic ticket, in the redeemed state, comprises a second electronic ticket value that is configurable to be different than the first electronic ticket value; and in response to updating the electronic record to indicate that the electronic ticket has transitioned from the redeemable state into the redeemed state, securing the electronic record from further updates.

2. The method of claim 1, wherein the second electronic ticket value is used in connection with funding wagers placed at a second gaming device, and wherein the first credit meter is decremented by the first electronic ticket value, the method further comprising:

determining, at the gaming server after the second time, that the electronic ticket has transitioned from the issued state to the redeemable state;

determining, at the gaming server after the second time, that the electronic ticket is being redeemed at the second gaming device; and in response to determining that the electronic ticket is being redeemed at the second gaming device, causing the second gaming device to update a second credit meter with the second electronic ticket value.

3. The method of claim 2, wherein the electronic record indicates that the electronic ticket, in the redeemable state, comprises the second electronic ticket value.

4. The method of claim 1, wherein the electronic ticket, when in the redeemable state, is redeemable using a mobile device associated with the player.

5. The method of claim 4, wherein the electronic record comprises a first data field to store data describing a second gaming device as a redeeming device for the electronic ticket and a second data field to store data describing a time after the second time when the electronic ticket is redeemed at the second gaming device.

6. The method of claim 5, further comprising:
in response to determining that the electronic ticket is being redeemed, causing the second gaming device to increment a second credit meter by the second electronic ticket value; and
updating, at the gaming server, the second data field of the electronic record to indicate that the second credit meter was incremented by the second electronic ticket value.

7. The method of claim 1, wherein the electronic record indicates that the electronic ticket, in the redeemable state, comprises a third electronic ticket value.

8. The method of claim 1, wherein the second electronic ticket value is less than the first electronic ticket value.

9. The method of claim 1, further comprising:
generating a synthesized credit meter that corresponds with the first gaming device and that mirrors the first credit meter of the first gaming device.

10. A gaming system, comprising:
a communication interface that facilitates communications with gaming devices, wherein each of the gaming devices comprise a credit meter that tracks activity at a corresponding gaming device including wagers placed and payouts made during a game of chance or skill played at the corresponding gaming device;
a processor coupled with the communication interface; and
a computer-readable storage medium coupled with the processor, the computer-readable storage medium comprising processor-executable instructions that, when executed by the processor, cause the processor to:
receive electronic ticket issuance information from a first gaming device, wherein the electronic ticket issuance information includes an identifier of the first gaming device that issued an electronic ticket, a first time that the electronic ticket was issued, and an electronic ticket value associated with an issued state of the electronic ticket, wherein the electronic ticket, when issued, comprises an association with an event ending at a second time later than the first time, wherein the electronic ticket in the issued state is not redeemable, and wherein a balance of one or more credits remain on the credit meter following the electronic ticket being issued thereby allowing a player to continue playing the game of chance or skill with the balance of the one or more credits;
automatically update, at the second time, a status of the electronic ticket to transition from the issued state to a redeemable state;
track a status of the electronic ticket after the second time and while the electronic ticket is in the redeemable state;
determine after the second time that the electronic ticket has been presented for redemption and, in response thereto, cause the electronic ticket value to change to a second electronic ticket value associated with a redeemed state of the electronic ticket, wherein the second electronic ticket value depends on an outcome of the event; and
secure a data structure associated with the electronic ticket from a rewrite after the electronic ticket has change to the second electronic ticket value associated with the redeemed state of the electronic ticket.

11. The system of claim 10, wherein the processor-executable instructions further cause the processor to generate a synthesized credit meter that corresponds with the first gaming device and that mirrors a first credit meter of the first gaming device.

12. The system of claim 10, wherein the electronic ticket is transitioned to the redeemable state after the issued state and is transitioned to the redeemed state after the redeemable state, and wherein the second electronic ticket value is also associated with the redeemable state.

13. The system of claim 10, wherein the second electronic ticket value is configurable to be different from the first electronic ticket value.

14. The system of claim 10, further comprising:
a database interface that couples the processor to a database, wherein the database interface is used to write electronic ticket values to and retrieve electronic ticket values from the database.

15. The system of claim 10, wherein the electronic ticket, in the redeemable state, comprises a third electronic ticket value.

16. The system of claim 10, wherein the electronic ticket, when in the redeemable state, is redeemable using a mobile device.

17. The system of claim 16, wherein the data structure comprises a first data field to store data describing the mobile device as a redeeming device for the electronic ticket.

18. The system of claim 17, wherein the data structure further comprises a second data field to store data describing a time after the second time when the electronic ticket is redeemed at the mobile device.

19. The system of claim 10, wherein the second electronic ticket value is less than the first electronic ticket value.

20. The system of claim 10, wherein the processor comprises a plurality of processors.

* * * * *